United States Patent
Kai et al.

(10) Patent No.: US 7,842,644 B2
(45) Date of Patent: Nov. 30, 2010

(54) CATALYST FOR OXIDATION OF METAL MERCURY

(75) Inventors: Keiichiro Kai, Kure (JP); Yasuyoshi Kato, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/441,778

(22) PCT Filed: Sep. 21, 2007

(86) PCT No.: PCT/JP2007/068417

§ 371 (c)(1),
(2), (4) Date: May 1, 2009

(87) PCT Pub. No.: WO2008/035773

PCT Pub. Date: Mar. 27, 2008

(65) Prior Publication Data

US 2009/0311155 A1 Dec. 17, 2009

(30) Foreign Application Priority Data

Sep. 22, 2006 (JP) ............................. 2006-256639

(51) Int. Cl.
*B01J 23/00* (2006.01)
(52) U.S. Cl. ...................................... 502/311; 502/305
(58) Field of Classification Search ................. 502/311, 502/305
See application file for complete search history.

(56) References Cited

U.S. PATENT DOCUMENTS 7,264,784 B2 * 9/2007 Kuma et al. .................. 423/210

2003/0170159 A1 9/2003 Honjo

FOREIGN PATENT DOCUMENTS

| EP | 0323195 | A2 | 7/1989 |
| EP | 1525913 | A2 | 4/2005 |
| JP | 1176431 | A | 7/1989 |
| JP | 2001219066 | A | 8/2001 |
| JP | 2005125211 | A | 5/2005 |
| JP | 2006205128 | A | 8/2009 |

OTHER PUBLICATIONS

International Search Report for PCT/JP2007/068417 dated Nov. 20, 2007.
Takehira K. et al: "Oxidation of C2-C4 alkanes over MoO3-V2O5 supported on a YSZ-aided membrane reactor", Applied Catalysis A: General, Elsevier Science, Amsterdam, NL, vol. 277, No. 1-2, pp. 209-217, Dec. 8, 2004.
Supplementary European Search Report and European search opinion of EP 07807748.4, Apr. 15, 2010.

* cited by examiner

*Primary Examiner*—Timothy C Vanoy
*Assistant Examiner*—Michelle Hou
(74) *Attorney, Agent, or Firm*—Heslin Rothenberg Farley & Mesiti P.C.

(57) ABSTRACT

A catalyst is provided having higher mercury oxidation performance than a conventional catalyst without increasing catalyst quantity or enhancing $SO_2$ oxidation performance and constitutes an oxidation catalyst for metal mercury, which contains a molybdenum and vanadium complex oxide, for example, $MoV_2O_8$, as a main component having a catalytic activity and is formed by placing the molybdenum and vanadium complex oxide in layers only on the surface of a plate-like or honeycomb-like porous carrier. The porous carrier contains Ti and W and has a function of an NOx removal catalyst as a whole.

12 Claims, 1 Drawing Sheet

CATALYST FOR OXIDATION OF METAL MERCURY

TECHNICAL FIELD

The present invention relates to an oxidation catalyst for metal mercury contained in exhaust gas and a method of purifying exhaust gas.

BACKGROUND ART

Recently, it has been feared that petroleum oil runs out. As a next stable energy-supply source used for a long time, thermal power generation using coal, which is rich in recoverable reserves and less in regional maldistribution, as fuel, has been expected to play an important role from now on.

On the other hand, minor elements (e.g., mercury (Hg) selenium (Se), arsenic (As), cadmium (Cd) and lead (Pd)) contained in an amount of 0.1% or less in exhaust gas, which is generated with combustion of coal, have known to be toxic to living organisms when they are present in excess of an allowable concentration. In particular, mercury, which is an element having a high vapor pressure, is easily emitted in the air. When exposed to a human body, even in a small amount, mercury causes neurological disorder, renal disorder and cardiovascular disorder. In addition, when inorganic mercury emitted in the air is absorbed by lakes and the sea, the inorganic mercury changes into organic mercury (methyl mercury). Such organic mercury, when it is absorbed into a human body via fishery products, produces teratogenic effects. For the reason, strict regulations are going to be imposed on discharge of mercury in countries all over the world centering on the United States.

Among mercury contained in the exhaust gas discharged from a thermal power generation plant, there are metal-form mercury and oxide-form mercury. Of them, the metal-form mercury is not fixed to smoke and other particles and thus remains in a gas phase at a temperature even close to the atmospheric temperature. Therefore, it is difficult to remove the metal-form mercury by an electric dust collector and a dusting machine such as a bag filter. On the other hand, the oxide-form mercury, in particular, mercury chloride, which is produced by reacting with hydrogen chloride or chlorine in exhaust gas, has a low vapor pressure and solubility and thus is easily fixed in ash and absorption liquid of desulfurization equipment. Therefore, the oxide-form mercury is relatively easily collected and removed by a dusting machine such as an electric dust collector and desulfurization equipment, etc.

In the circumstances, studies have been conducted for removing metal-form mercury by oxidizing it into oxide-form mercury having a low vapor pressure by use of a solid catalyst having a function of oxidizing mercury and then removing the oxide-form mercury by a dust collector and desulfurization equipment provided downstream. As such a solid catalyst, for example, common NOx removal catalysts (Ti—Mo—V, Ti—W—V), which contain titanium (Ti) as a main component and oxides of vanadium (V), molybdenum (Mo), tungsten (W) and the like as additional components, are known well. These catalysts are capable of efficiently oxidizing metal-form mercury into oxide-form mercury in the presence of a halogen compound (Patent Documents 1 and 2). Furthermore, Patent Document 3 discloses a method of removing nitrogen oxides by use of a catalyst whose catalytic activity is rarely lowered by the presence of volatile metal compounds in exhaust gas. Patent Document 4 discloses a catalyst for removing organic halogen compounds, which contains titanium oxide ($TiO_2$), a titania-silica complex oxide ($TiO_2$—$SiO_2$) or a mixture of them and further contains a vanadium and molybdenum complex oxide.

In the Ti—Mo—V catalyst or Ti—W—V catalyst as mentioned above, the oxidation rate of metal mercury decreases when the temperature of exhaust gas is high and the concentration of a halogen compound in exhaust gas is low. To deal with the decrease of the oxidation rate, the amount of a catalyst may be increased. If the number of active centers is increased, the oxidation activity of metal mercury can be improved. However, this approach has a big problem in that oxidation activity of $SO_2$ also augments with an increase of the amount of catalyst. Patent Document 3 and 4 are silent about removal of metal mercury by oxidation.

Patent Document 1: JP2005-125211A1
Patent Document 2: JP2003-53142A1
Patent Document 3: JP01-176431A1
Patent Document 4: JP2001-219066A1

DISCLOSURE OF THE INVENTION

An object of the present invention is to provide a catalyst having higher mercury oxidation performance than a conventional catalyst without increasing catalyst quantity or $SO_2$ oxidation performance.

The aforementioned object can be attained by a catalyst, which is involved in an oxidation reaction between metal mercury contained in exhaust gas and oxygen or hydrogen chloride, and which contains a molybdenum and vanadium complex oxide (hereinafter, referred to as "Mo—V complex oxide") as a main component having a catalytic activity, and by placing the Mo—V complex oxide in layers only on the surface of a plate-like or honeycomb-like porous carrier.

As the Mo—V complex oxide, for example, $MoV_2O_8$ is used. Furthermore, the Mo—V complex oxide may be diluted with a diluent made of at least one type of element selected from silica, titania, alumina and zirconia.

The molar mixing ratio of the diluent to the Mo—V complex oxide desirably falls within the range of 0/100 to 90/10.

Exhaust gas containing metal mercury is brought into contact with the aforementioned catalyst to oxidize metal mercury present in the exhaust gas.

The present inventors employed a Mo—V complex oxide as a component having a catalytic activity and placed the Mo—V complex oxide in layers only on the surface of a plate-like or honeycomb-like porous carrier and used as a catalyst. The catalyst is capable of efficiently oxidizing metal mercury in exhaust gas in the presence of oxygen or hydrogen chloride, and characterized in that high performance can be realized simply by placing the Mo—V complex oxide only on the surface of a plate-like or honeycomb-like porous carrier.

The main active ingredient of the catalyst is a Mo—V complex oxide represented, for example, by a formula "$MoV_2O_8$". The mercury oxidation performance of the catalyst is higher than a catalyst in which a Mo oxide and a V oxide are separately present. Furthermore, the oxidation reaction of mercury, the rate of which is restricted by the dispersion rate of gas in fine holes of the catalyst, can proceed well on the surface portion of the catalyst. In contrast, the oxidation reaction of $SO_2$, the rate of which is low, is largely dependent upon the absolute amount of catalyst including the inner portion of the catalyst. Therefore, a catalyst is formed by placing the Mo—V complex oxide only on the surface of a porous carrier in layers such that no active centers are present within the catalyst. In this manner, mercury oxidation performance alone can be enhanced without enhancing the $SO_2$ oxidation performance.

Furthermore, the Mo—V complex oxide as mentioned above may be diluted by using an oxide such as silica, titania, alumina or zirconia, which is inactive to the mercury oxidation reaction, as a diluent and applied onto the surface of the porous carrier. If this approach is employed, the amount of an active ingredient for use in coating can be controlled simply by changing the mixing ratio of the Mo—V complex oxide to the diluent. The operation can be simplified. In addition, the layer of an active ingredient can be formed on the surface layer of a catalyst in the state where the Mo—V complex oxide is densely dispersed on the surface of diluent particles. As a result, when exhaust gas is passed through the catalyst, more specifically, when exhaust gas is diffused through fine pores of the catalyst, active centers of the catalyst can be easily in contact with metal mercury. Thus, it is possible to obtain high mercury oxidation performance even if the amount of active ingredient is low, compared to the case where the Mo—V complex oxide is not diluted.

In addition, the diluent mentioned above also serves as a binder between the porous carrier and the active ingredient in a coating process. Therefore, use of mixed slurry of the Mo—V complex oxide and a diluent is advantageous because the abrasion resistance of the catalyst surface after coating can be improved.

BEST MODE FOR CARRYING OUT THE INVENTION

Figure 1:
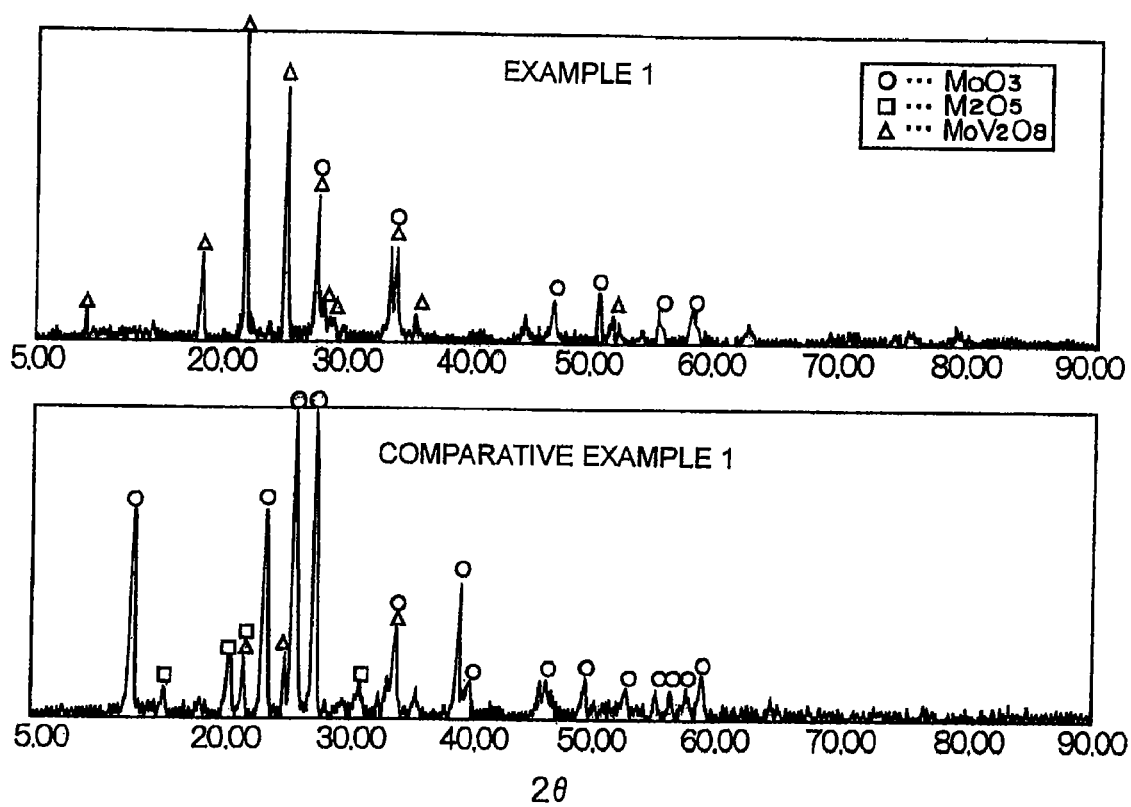
FIG. 1 shows qualitative analysis results of the compositions of Mo—V catalysts described in Example 1 and Comparative Example 1 by X-ray diffraction.

In a method of preparing a Mo—V complex oxide, as a molybdenum material, other than alkaline molybdates generally known in the art such as ammonium molybdate and sodium molybdate, molybdic acid and molybdenum trioxide can be used. However, in the case of an alkaline molybdate, if an alkaline molybdate containing an alkaline metal or an alkaline earth metal such as sodium, potassium or magnesium is used, these alkaline components serve as a catalyst poison and may accelerate deterioration of a catalyst. For this reason, ammonium molybdate is preferably used.

As a raw material for vanadium, it is better to use a vanadium compound having a valence number of 4 or less. For example, vanadium dioxide or vanadyl oxalate is desirably used. Vanadium compounds having a valence number of 5 such as ammonium vanadate and vanadium pentoxide are not preferable. This is because even if such a vanadium compound is mixed with the aforementioned molybdenum compound, molybdenum and vanadium tend to separately form their own oxides and a complex oxide is rarely formed. Furthermore, the Mo—V complex oxide can be prepared in accordance with a known method by mixing at least one type of each of molybdenum material and vanadium material as mentioned above, and heating the solution mixture with stirring followed by drying and/or baking. When the baking temperature herein is extremely low, conjugation of molybdenum and vanadium cannot be sufficiently performed. Conversely, when the baking temperature is extremely high, the particle size of the Mo—V complex oxide becomes too large. For the reason, the baking temperature is preferably from 400 to 600° C.

As a carrier to be coated with a Mo—V complex oxide, various types of inorganic porous carriers can be used. For example, honeycomb-like carrier formed of a corrugated inorganic fiber sheet, a nonwoven inorganic-fiber sheet or a ceramic honeycomb carrier formed of cordierite, alumina or the like, knitted web formed by knitting an inorganic fiber yarn such as an E glass fiber in reticular form, and the like can be used. In addition, a carrier having the aforementioned inorganic fiber product placed on a knitted product such as wire netting or metal lath can be used.

These various types of inorganic porous carriers can be coated with a Mo—V complex oxide by a method of soaking the inorganic porous carrier in slurry obtained by adding water to the Mo—V complex oxide, followed by drying and/or baking or by a method of transferring and attaching the slurry onto the surface of a carrier by use of a roller impregnated with the slurry. At this time, the amount of Mo—V complex oxide to be carried on the carrier is preferably 50 to 300 g/m$^2$ (thickness of the catalyst layer: 0.05 to 0.3 mm). However, the amount of 150 to 200 g/m$^2$ (thickness of the catalyst layer: 0.15 to 0.2 mm) is better since good results can be easily obtained. If the amount is excessively low, sufficient performance cannot be obtained. In contrast, if the amount is excessively large, the catalyst removes. Both cases are not preferred. The baking may be performed at a temperature within the range of 400 to 600° C.

When a Mo—V complex oxide is diluted with a diluent and put in use, any diluent may be used as long as it is inactive by itself to an oxidation reaction. Powders of oxides such as silica, titania, alumina and zirconia can be used. These diluents may be used in a combination of two or more types. The mixing ratio of a diluent to a Mo—V complex oxide can be arbitrarily selected depending upon the desired catalyst amount and the coating method. It is satisfactory if the molar mixing ratio of a diluent to a Mo—V complex oxide falls within the range of 0/100 to 90/10. When the ratio of a diluent increases, a Mo—V complex oxide can be easily dispersed densely over the surface of diluent particles. In addition, adhesiveness of an active ingredient is improved in coating to a porous carrier. Therefore, good results are easily obtained. As a carrier to be coated with a diluent/Mo—V complex oxide, various types of porous carriers as mentioned above can be used. These various types of inorganic porous carriers can be coated with a diluent/Mo—V complex oxide by a method of soaking an inorganic porous carrier in slurry obtained by adding water to the diluent/Mo—V complex oxide followed by drying and/or baking, or a method of transferring and attaching the slurry onto the surface of a carrier by use of a roller impregnated with the slurry. At this time, the amount of diluent/Mo—V complex oxide to be carried on the carrier is preferably 50 to 200 g/m$^2$ (thickness of the catalyst layer: 0.05 to 0.2 mm). However, the amount of 100 to 150 g/m$^2$ (thickness of the catalyst layer: 0.1 to 0.15 mm) is better since good results can be easily obtained. If the amount is excessively low, sufficient performance cannot be obtained. In contrast, if the amount is excessively large, the catalyst removes. Both cases are not preferred. The baking may be performed at a temperature within the range of 400 to 600° C.

Embodiments of the present invention will be described by way of specific examples below.

Example 1

Titanic oxide, ammonium paratungstate, water and silica based inorganic fiber were mixed and kneaded by use of a kneader to obtain catalyst paste having a composition of Ti/W=95/5 (atomic ratio). Separately from this, SUS430 band steel was processed into a metal lath to obtain a mesh-form base material having a mesh opening of about 2 mm. On the base material, the aforementioned catalyst paste was placed. The paste was fitted in the openings and on the surface of the mesh-form base material by operating a pressure roller thereon to obtain a plate-like product having a thickness of 0.7 mm. The plate-like product was dried at 150° C. for 2 hours and baked at 500° C. for 2 hours in the air to obtain a plate-like porous carrier.

Ammonium molybdate and vanadium sol ($VO_2$ sol: 20 wt %) were mixed to as to obtain a Mo/V atomic ratio of 1/1 and vaporized, dried and solidified at 150° C. for about 2 hours. The obtained powder was baked at 500° C. for 2 hours in the air and pulverized to obtain Mo—V catalyst powder. Subsequently, an appropriate amount of water was added to the Mo—V catalyst powder to obtain 30 wt % catalyst slurry, to which the plate-like porous carrier was soaked. Thereafter, liquid was drained and dehydration was performed at 150° C. for 2 hours. After that baking was performed at 500° C. for 2 hours in the air to prepare a plate-like catalyst having a catalyst in an amount of 200 g/m² (the thickness of catalyst layer: 0.2 mm). In this Example, the Mo—V catalyst is carried in layers only on the surface of the plate-like porous carrier. Note that the Mo—V catalyst of the Example is formed of a Mo—V complex oxide as a main component, as described later.

Example 2

A plate-like catalyst was prepared in the same manner as in Example 1 except that the vanadium material was changed from vanadium sol to vanadyl oxalate. Also in this Example, the Mo—V catalyst is carried in layers only on the surface of the plate-like porous carrier and formed of a Mo—V complex oxide as a main component.

Comparative Example 1

A plate-like catalyst was prepared in the same manner as in Example 1 except that the vanadium material was changed to ammonium metavanadate. In this Comparative Example, the Mo—V catalyst is carried in layers only on the surface of the plate-like porous carrier. Note that Mo—V catalyst is not formed of a Mo—V complex oxide as a main component, as described later.

Comparative Example 2

Titanic oxide, ammonium paratungstate, ammonium metavanadate, water and silica based inorganic fiber were mixed and kneaded by use of a kneader to obtain catalyst paste having a composition of Ti/W/V=91/5/4 (atomic ratio). Separately from this, SUS430 band steel was processed into a metal lath to obtain a mesh-form base material having a mesh opening of about 2 mm. On the base material, the aforementioned catalyst paste was placed. The paste was fitted in the openings and on the surface of the mesh-form base material by operating a pressure roller thereon to obtain a plate-like catalyst having a thickness of 0.7 mm. The plate-like catalyst was dried at 150° C. for 2 hours and baked at 500° C. for 2 hours in the air.

Comparative Example 3

A plate-like catalyst was prepared in the same manner as in Comparative Example 1 except that the catalyst composition was changed to Ti/W/V=93.5/5/1.5.

Comparative Example 4

A plate-like catalyst was prepared in the same manner as in Comparative Example 1 except that the catalyst composition was changed to Ti/W/V=88/5/7.

The Mo—V catalysts prepared in Example 1 and Comparative Example 1 were separately analyzed by X-ray diffraction. The results are shown in FIG. 1. As is apparent from the FIGURE, when ammonium metavanadate was used as the vanadium material, vanadium and molybdenum were present separately as vanadium oxide ($V_2O_5$) and molybdenum oxide ($MoO_3$) in the catalyst. In contrast, when $VO_2$ sol was used as the vanadium material, $MoV_2O_8$ complex oxide was present as a main component. Furthermore, when vanadyl oxalate was used, $MoV_2O_8$ complex oxide was also present as a main component.

Furthermore, with respect to the catalysts according to Examples 1 and 2 and Comparative Examples 1 to 4, to confirm effect of the molybdenum and vanadium complex oxide upon catalyst performance, Hg oxidation rate, NOx removal efficiency and $SO_2$ oxidation rate were separately determined in the experimental conditions shown in Table 1. The results are collectively shown in Table 2.

TABLE 1

| GAS COMPOSITION | $CO_2$ | 12% |
| --- | --- | --- |
| | $H_2O$ | 10% |
| | $O_2$ | 3% |
| | $SO_2$ | 1000 ppm |
| | NO | 300 ppm |
| | $NH_3$ | 360 ppm |
| | HCl | 30 ppm |
| | Hg | 10 ng/L |
| | $N_2$ | BALANCE |
| MEASUREMENT CONDITIONS | GAS FLOW RATE | 3 L/min |
| | AV | 15 m/h |
| | TEMPERATURE | 350° C. |

TABLE 2

| | COMPOSITION OF CATALYST COMPONENT | Hg-OXIDATION RATE (%) | NOx REMOVAL EFFICIENCY (%) | $SO_2$-OXIDATION RATE (%) |
| --- | --- | --- | --- | --- |
| EXAMPLE 1 | $MoV_2O_8/MoO_3$ | 78 | 98 | 0.8 |
| EXAMPLE 2 | $MoV_2O_8/MoO_3$ | 78 | 98 | 0.8 |
| COMPARATIVE EXAMPLE 1 | $V_2O_5/MoO_3$ | 72 | 97 | 1.0 |
| COMPARATIVE EXAMPLE 2 | $TiO_2/MoO_3/V_2O_5$ | 77 | 98 | 3.9 |
| COMPARATIVE EXAMPLE 3 | $TiO_2/MoO_3/V_2O_5$ | 72 | 97 | 1.3 |
| COMPARATIVE EXAMPLE 4 | $TiO_2/MoO_3/V_2O_5$ | 82 | 99 | 5.8 |

As is apparent from Table 2, the catalysts (Examples 1 and 2) having a Mo—V complex oxide formed therein can oxidize metal mercury more efficiently than the catalyst (Comparative Example 1) in which vanadium oxide and molybdenum oxide are separately present. Furthermore, by forming the Mo—V complex oxide in layers only on the surface of a catalyst, $SO_2$ oxidation rate can be suppressed to be lower than the catalyst (Comparative Example 2) in which active ingredient of the catalyst for use in oxidation of metal mercury is uniformly dispersed.

Example 3

To the Mo—V catalyst powder according to Example 1, silica powder was added as a diluent. Thereafter, an appropriate amount of water was added to obtain 20 wt % mixed slurry having a molar mixing ratio of silica powder to the Mo—V catalyst powder of 90/10. Subsequently, the aforementioned plate-like porous carrier was soaked in the mixed slurry. Thereafter, liquid was drained and dehydration was performed at 150° C. for 2 hours. After that baking was performed at 500° C. for 2 hours in the air to prepare a plate-like catalyst having a catalyst in an amount of 150 g/m² (the thickness of catalyst layer: 0.15 mm).

Example 4

A plate-like catalyst was prepared in the same manner as in Example 3 except that the diluent was changed to titanium oxide powder.

Comparative Example 5

To the Mo—V catalyst powder used in Comparative Example 1, silica powder serving as a diluent was added. Thereafter, an appropriate amount of water was added to obtain 20 wt % mixed slurry having a molar mixing ratio of the silica powder to the Mo—V catalyst powder of 90/10. Subsequently, the aforementioned plate-like porous carrier was soaked in the mixed slurry. Thereafter, liquid was drained and dehydration was performed at 150° C. for 2 hours. After that baking was performed at 500° C. for 2 hours in the air to prepare a plate-like catalyst having a catalyst in an amount of 150 g/m² (the thickness of catalyst layer: 0.15 mm).

Comparative Example 6

A plate-like catalyst was prepared in the same manner as in Comparative Example 5 except that the diluent was changed to titanium oxide powder.

With respect to the catalysts according to Examples 3 and 4 and Comparative Examples 5 and 6, Hg oxidation rate, NOx removal efficiency and $SO_2$ oxidation rate were determined in the experimental conditions shown in Table 1. The results are collectively shown in Table 3. As is apparent from Table 3, when a catalyst component is diluted with an appropriate diluent such as silica or titania, a catalyst in which $MoV_2O_8$ complex oxide is carried only on the surface of a plate-like porous carrier maintains high Hg oxidation rate.

TABLE 3

| | DILUENT | COMPOSITION OF CATALYST COMPONENT | Hg-OXIDATION RATE (%) | NOx REMOVAL EFFICIENCY (%) | $SO_2$-OXIDATION RATE (%) |
|---|---|---|---|---|---|
| EXAMPLE 3 | $SiO_2$ | $MoV_2O_8$ + $MoO_3$ | 78 | 98 | 0.7 |
| EXAMPLE 4 | $TiO_2$ | $MoV_2O_8$ + $MoO_3$ | 79 | 99 | 0.8 |
| COMPARATIVE EXAMPLE 5 | $SiO_2$ | $V_2O_5$ + $MoO_3$ | 60 | 98 | 0.7 |
| COMPARATIVE EXAMPLE 6 | $TiO_2$ | $V_2O_5$ + $MoO_3$ | 65 | 99 | 0.8 |

In each of the aforementioned Examples, the catalyst is prepared in the form of a plate. The form is not limited to a plate and may be, for example, a honeycomb. Other forms may be used as long as they are generally employed as the forms of a catalyst. What is important is that a Mo—V complex oxide is formed in layers on the surface of a porous carrier.

As described above, by forming a Mo—V complex oxide in layers on the surface of a porous carrier as a catalyst, a catalyst having higher mercury oxidation performance than a conventional catalyst can be provided without increasing catalyst quantity or $SO_2$ oxidation performance.

The invention claimed is:

1. An oxidation catalyst for metal mercury used for oxidatively reacting metal mercury contained in exhaust gas with oxygen or a halogen compound, wherein a main component of the catalyst having a catalytic activity comprises a binary molybdenum and vanadium complex oxide, the molybdenum and vanadium complex oxide being carried in layers only on a surface of a plate-like or a honeycomb-like porous carrier.

2. The oxidation catalyst for metal mercury according to claim 1, wherein the molybdenum and vanadium complex oxide comprises $MoV_2O_8$.

3. The oxidation catalyst for metal mercury according to claim 1 or 2, wherein the molybdenum and vanadium complex oxide is diluted with a diluent comprising at least one element selected from silica, titania, alumina and zirconia.

4. The oxidation catalyst for metal mercury according to claim 3, wherein a molar mixing ratio of the molybdenum and vanadium complex oxide relative to the diluent falls within the range of larger than 0 and 9 or less.

5. The oxidation catalyst for metal mercury according to claim 4, wherein the porous carrier contains Ti and W.

6. A method of purifying exhaust gas comprising oxidizing metal mercury in exhaust gas by bringing the exhaust gas containing metal mercury into contact with the catalyst according to claim 4.

7. The oxidation catalyst for metal mercury according to claim 3, wherein the porous carrier contains Ti and W.

8. A method of purifying exhaust gas comprising oxidizing metal mercury in exhaust gas by bringing the exhaust gas containing metal mercury into contact with the catalyst according to claim 7.

9. A method of purifying exhaust gas comprising oxidizing metal mercury in exhaust gas by bringing the exhaust gas containing metal mercury into contact with the catalyst according to claim 3.

10. The oxidation catalyst for metal mercury according to any of claims 1 and 2, wherein the porous carrier contains Ti and W.

11. A method of purifying exhaust gas comprising oxidizing metal mercury in exhaust gas by bringing the exhaust gas containing metal mercury into contact with the catalyst according to claim 10.

12. A method of purifying exhaust gas comprising oxidizing metal mercury in exhaust gas by bringing the exhaust gas containing metal mercury into contact with the catalyst according to any of claims 1 and 2.

* * * * *